(12) United States Patent
Gabber et al.

(10) Patent No.: US 7,058,763 B2
(45) Date of Patent: Jun. 6, 2006

(54) FILE SYSTEM FOR CACHING WEB PROXIES

(75) Inventors: Eran Gabber, Summit, NJ (US); Elizabeth Shriver, Jersey City, NJ (US); Christopher Stein, Cambridge, MA (US); Lan Huang, Stonybrook, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 756 days.

(21) Appl. No.: 09/848,826

(22) Filed: May 4, 2001

(65) Prior Publication Data

US 2002/0165911 A1 Nov. 7, 2002

(51) Int. Cl.
*G06F 12/00* (2006.01)

(52) U.S. Cl. .................. 711/118; 711/136; 709/216; 709/217; 709/223; 709/225

(58) Field of Classification Search ............... 711/137, 711/118, 136; 709/216, 217, 223, 225
See application file for complete search history.

(56) References Cited

U.S. PATENT DOCUMENTS

| | | | | |
|---|---|---|---|---|
| 5,138,705 A | * | 8/1992 | Lo et al. ............... | 711/2 |
| 5,754,888 A | * | 5/1998 | Yang et al. ............ | 710/52 |
| 5,813,017 A | * | 9/1998 | Morris .................. | 707/204 |
| 5,983,240 A | * | 11/1999 | Shoroff et al. .......... | 707/200 |
| 6,389,510 B1 | * | 5/2002 | Chen et al. ............. | 711/113 |
| 6,523,102 B1 | * | 2/2003 | Dye et al. .............. | 711/170 |
| 6,640,285 B1 | * | 10/2003 | Bopardikar et al. ...... | 711/133 |
| 2003/0009538 A1 | * | 1/2003 | Shah et al. ............. | 709/219 |

OTHER PUBLICATIONS

60246384 Daniel Arai et al Adaptively optimized network streamed execution of conventionally coded applications.*

* cited by examiner

*Primary Examiner*—Christian P. Chace

(57) ABSTRACT

A special-purpose file system is provided which includes a combination of services and features which improve the performance of applications employing caches, such as caching web proxies. This file system also provides a file system cache which can be used as a general high-performance file system cache for file systems which need a cache. The services and features include collocating files together on a disk; keeping file meta-data in memory; compressing file names to hash values for reference; using a flat naming scheme for files; providing background daemons that pack files into clusters and clean disk and main memory space; and implementing a user-level library. The file system reduces access to related disk files, eliminates disk operations that are needed to maintain directory and meta-data information, and avoids multiple buffering of file data, and saves and efficiently manages disk and main memory space.

55 Claims, 1 Drawing Sheet

FILE SYSTEM FOR CACHING WEB PROXIES

FIELD OF THE INVENTION

This invention relates to a method for implementing an improved file system for use with a web proxy which caches web content data for later use. In particular, this invention relates to a method for implementing a file system to run on top of a raw disk partition to improve throughput by reducing the number of disk operations that must be performed in order to retrieve cached information.

BACKGROUND OF THE INVENTION

Large distributed data networks, such as the Internet, allow data to be shared between computers connected to the network. One protocol for such file sharing is the Hypertext Transfer Protocol ("HTTP") which is used to implement the World Wide Web ("the web"). Computers allow users to specify files to be retrieved over the web. Files can include image, sound, or other data files. Web pages written in HTML (Hypertext Markup Language) can be requested, and can include embedded references to files to be retrieved and embedded on the web page as displayed.

Because retrieving data over the network may be time-consuming and expensive, and data may be required more than once, caching web proxies have been developed. These are computer systems dedicated to caching and delivering web content. Typically, they exist on a firewall or at the point where an Internet Service Provider ("ISP") peers with its network access provider. These caching web proxies store copies of information downloaded from other computers on the network, and provide the information to users rather than downloading the same information over and over from the remote computer.

Caching web proxies reduce request load on remote servers, improve web client latency (the speed at which the web client can provide requested information), reduce variability in access time, improve the perceived availability of remote servers, and drive down network access costs. Caching web proxies store cached information in main memory and on disks. Recently used information is usually kept in main memory, while the rest is stored on disks. Prior art web proxies use a traditional file system to store information on disk, which causes multiple inefficiencies.

One problem with caching web proxies is that traditional file systems often include their own cache of data recently accessed. Thus, if the file system and the web proxy both cache data, multiple buffering may occur, which will drive down the hit rate by reducing the amount of memory used to store useful files. Another problem is that, when a file is requested from a file system, the file will be copied from the file system's buffer to the applications' address space. This copying takes time.

Two standard web proxies in common use are Squid (free software, copyrighted by the University of California San Diego, see http://www.squid-cache.org) and Apache (copyrighted by The Apache Software Foundation, see http://www.apache.org). These systems use the standard file system services provided by the host operating system. On a UNIX system, this will often be some variation or descendant of the 4.2 BSD UNIX Fast File System ("FFS").

On most UNIX file systems, including FFS, files are represented by collections of fixed-size blocks, typically 8 KB in size. When accessing a file, disk delays occur due to disk seeks occurring when the file blocks are not stored contiguously on disk. These file systems attempt to minimize the disk head positioning time by storing the file blocks contiguously and prefetching blocks when a file is being accessed sequentially. This strategy is successful for files that are less than 128 KB (on standard FFS configuration parameters). Thus when the workload is comprised mainly of small files, the largest source of disk delay is when the small files being requested are not stored near each other on the disk. FFS attempts to reduce this delay by having the user place files into directories, and locating files in a directory on a group of contiguous disk cylinders called cylinder groups. The responsibility for performance, then, relies on an application or user who must construct a directory hierarchy organized in a way which matches future usage patterns. In order to keep file lookup times low, the directory hierarchy must also be well-balanced and a single directory must not have too many entries. Squid and Apache both attempt to reduce data retrieval times by using a directory system. Squid attempts to balance the directory hierarchy, but in the process distributes documents referenced consecutively across directories. If documents are then re-referenced in the same order, different directories must be accessed, which will increase latency.

In FFS, data about the location of files ("file meta-data") is stored in the i-node structure, which is updated using synchronous disk writes to ensure data integrity. These synchronous writes may even be performed when a file is only being read to update some pieces of the meta-data. Since a web cache does not rely on file durability for correctness, such synchronous writes are not necessary—asynchronous writes could be used, which would improve performance. In addition, some of the file meta-data may not be needed by the application. Therefore FFS is limited in a way which adversely affects performance.

FFS was designed for workstation workloads, and is not optimized for the workload and requirements of a web proxy. Because file system latency is a key component in web client latency (see Alex Rousskov, Duane Wessels, and Glen Chisholm, "The First IRCache Web Cache Bake-Off—The Official Report" April 1999, available at http://www-.bakeoff.ircache.net/bakeoff-01/) improving file system latency is of key importance to improving web proxy performance.

Some commercial vendors, such as CacheFlow (distributed by CacheFlow Inc., see www.cacheflow.com) have improved performance by rebuilding the entire system stack—by implementing a special operating system with an application-specific file system executing on special hardware. These solutions are expensive.

Web proxies have certain workload characteristics which are unexploited by current caching systems. Files are always accessed sequentially and in their entirety. In one sample, it was found that most cacheable web documents are small with a median file size approximately 2 KB and average request size was 6167 B. Over 90% of the references in the sample were for documents smaller than 8 KB. Client web accesses generally consist of a request for an HTML page, followed by requests for the embedded data referenced in that page. We have termed these files together a locality set. When the HTML page is rereferenced, many of the same files from the initial locality set are again requested. Locality sets themselves are not much larger than files. In one sample, 42% were found to be 32 KB or smaller, 62% 64 KB or smaller, 73% 96 KB or smaller, and 80% 128 KB or smaller.

Web proxies also experience a large variability in workload and have frequent idle periods. This idle period can be exploited but has not been in prior art products.

This invention also relates to a method for implementing an improved file system cache for use with a file system which needs a high performance cache. In particular, this invention relates to a method for implementing a file system cache running on top of a raw disk partition to improve throughput by reducing the number of disk operations that must be performed in order to retrieve cached information.

SUMMARY OF THE INVENTION

An embodiment of the invention improves web proxy performance by providing a simple file system which can run on top of a raw disk partition and which: is easily portable to different operating systems; eliminates latency degradation due to multiple buffering and memory copy to an application's address space; and stores files which are likely to be accessed together in a way which will reduce the time it takes to retrieve these files if they are requested together again. In addition, an embodiment of the invention provides a file system which keeps file meta data in memory and implements a flat naming scheme (without directories).

In accordance with an embodiment of this invention, there is provided a method for managing the caching of data for possible later use, packing files likely to be used together into large clusters, and in which file pointers, rather than data, are passed between the file system and the proxy. System idle time is used to clean the main memory and disk so that there is room for new files and clusters and is used to write meta-data to disk for file system recovery.

DETAILED DESCRIPTION OF THE INVENTION

Figure 1:
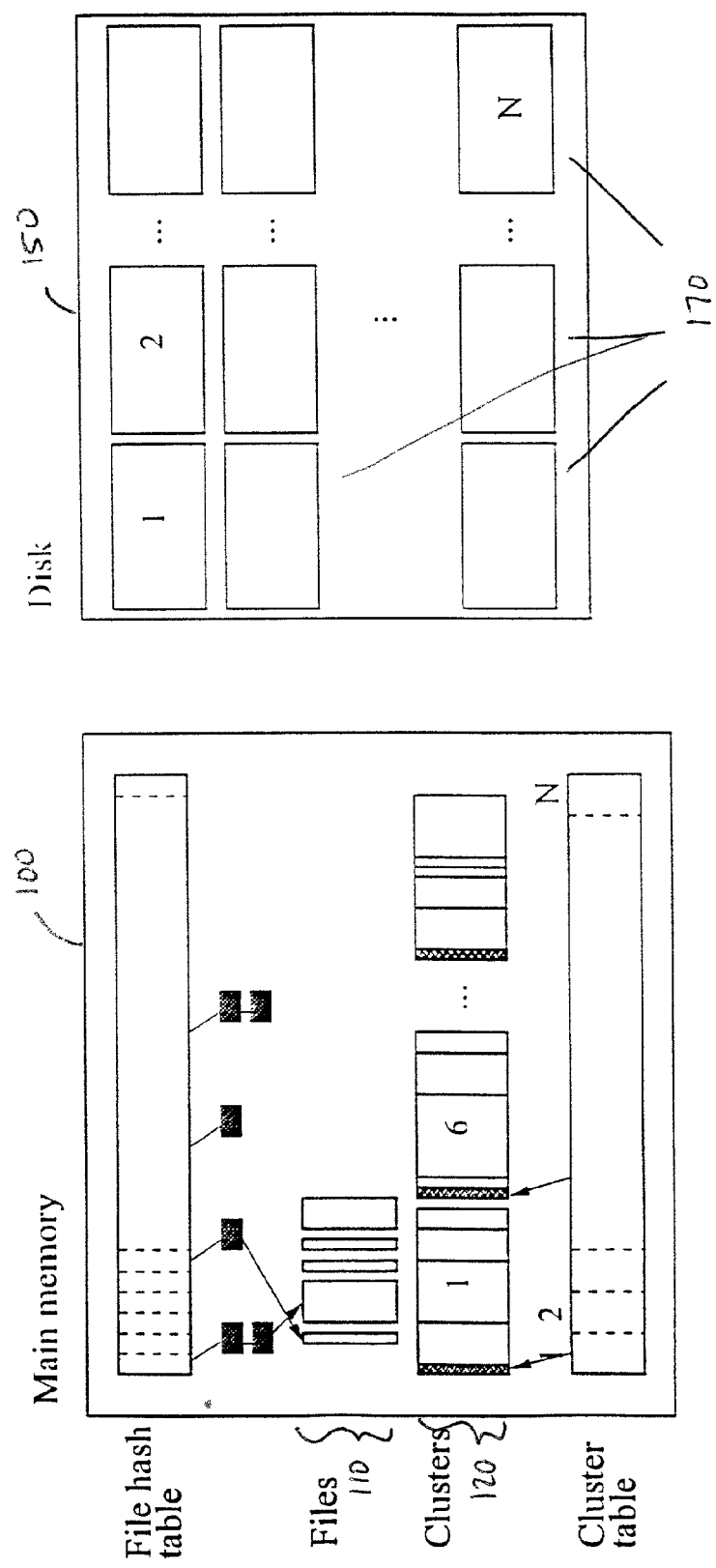
FIG. 1 is a schematic block diagram of the main memory and disk according to an embodiment of the invention.

Although applicable generally to any application for which data latency may be improved through the use of a cache, the present invention is useful in the web context, and lends itself to ready explanation in that context.

In a preferred embodiment of the invention, the file system is implemented by a lightweight library that accesses a raw disk partition. Two types of objects can be stored in main memory: files and clusters. This is illustrated in FIG. 1. In FIG. 1, main memory 100 and disk memory 150 are both shown, as are files 110 and clusters 120. Clusters may either be one size, or may vary in size. In a preferred embodiment, cluster size will be selected from a small subset of possible cluster sizes. In a preferred embodiment, some of these cluster sizes are selected using historical data about the locality sets stored in the clusters. In another embodiment, cluster sizes are based upon successive powers of two, which allows for implementation of the buddy algorithm.

A file 110 is created by a write_file( ) call. Clusters 120 will contain file data and some file-meta data—each cluster 120 is the size of a unit of disk access. Grouping file data into clusters 120 will allow the file system to physically collocate files together, since when a cluster is read from disk, all of the files in the cluster are read. Clusters can be evicted from main memory by reclaiming their space without writing to disk, since the cluster is written to disk as soon as it is created.

A file is read by an application using the read_file( ) call. Once the application is finished with the file, it issues a done_read_file( ) call.

The application provides "locality" hints about which files should be stored together. These locality hints can be generated on-line or off-line. This is done by using a collocate-_files(filenameA, filenameB) call. In the preferred embodiment, files are also collocated when the file system detects the order in which files are accessed and acts on this and other available information to infer patterns and collocate files together. The file system will save these hints until the files referred to are assigned to clusters. Assignment to clusters occurs as late as possible—that is, when space is needed in main memory. File system idle time is also used for cluster assignment. When a cluster is assigned, the system will attempt to write both filenameA and filenameB in the same cluster. It is possible for a file to be a member of multiple clusters (and so, stored in multiple locations on disk) by the application sending multiple hints (e.g., collocate_files(filenameA, filenameB) and collocate_files(filenameC, filenameB)). For proxy caches, this is a useful feature, since embedded images are frequently used in a number of related HTML pages.

When the file system is building a cluster, it determines which files to add to the cluster using a least recently used ("LRU") ordering according to the last time the file had been finished being read (i.e., the time of a done_read_file( ) call). If the least recently used file has a list of collocated files, then those files are added to the cluster if they are in main memory. (Even if a file has been stored in a cluster, it may still remain in main memory as part of a cluster. If it does, and a collocate_file( ) call has been made which indicates that it should be packed in with the file currently being packed up, then it will be saved in both the original and the new cluster.) Files are packed into the cluster until the cluster threshold is reached, or until all files on the LRU list have been processed. Then the cluster is saved to disk 150 in one of disk-stored clusters 170. This way, small locality sets with similar done_read_file times can be packed into the same cluster.

Large files are special. They account for a very small fraction of the requests, but a significant fraction of the bytes transferred. Caching these large files is not important for the average latency perceived by clients, but it is an important factor in the network access costs of the ISP. It is better to store these large files directly on disk, and not in the file system cache in memory. The write_nomem_file( ) call bypasses the main memory cache and writes a file directly to disk 150. If a file is larger than the cluster size, it will be written as multiple disk-stored clusters 170. Both the file and the resulting clusters are considered uncacheable.

The system maintains three kinds of meta-data about the data being stored: file system meta-data, file meta-data 115, and cluster meta-data 125.

File system meta-data (not shown) includes counts on the amount of space which has been used in main memory for storing files and file system data. To assist with determining which files and clusters to evict from main memory, two lists LRU lists are maintained—one for files (file meta-data 115) and another for clusters which are in memory (cluster meta-data 125).

File meta-data 115 includes a hash table 117 and pointers to the file information 119. File information 119 includes, a file number, the status of the file, and a reference count of the number of users currently reading the file. The file status field identifies each file as: in no cluster, in one cluster, in more than one cluster, or uncacheable. In a preferred embodiment, there are additional possibilities for file status that are supported to improve performance, including a status field indicating that the file is in one cluster which is in memory, or that the file is in more than one cluster, one of which is in memory. Until the file becomes a member of a cluster, the file's name and size is maintained as part of the file information 119. When a file is added to the cluster, the file information 119 in the meta-data 115 must include the cluster ID and the file reference count for that file. If the cluster is in main memory, the file information includes pointers to the file in the cluster.

The file number stored in file information 119 is a hash for the file name. Because Uniform Resource Locators (URLs) are used for file names, URLs may be extremely long, and average file size is small, we do not want to store URLs permanently in memory. Instead, a hash transforms the filename into a 32-bit number, and this number is used to locate the correct file meta-data. Hash collisions, where two possible filenames hash to the same hash number, can be solved by comparing the requested file name with the file name stored on disk, once the cluster is brought in. If there is a collision and the file name retrieved does not match the request, the next element in the hash table bucket is checked.

In another embodiment, file system policies include processing at the file level (deletion of files based on the last access time) and additional file meta-data is needed.

Cluster meta-data 125 is a cluster table which contains information about each cluster on disk. This information includes the status, time last accessed, and a linked list of the files in the cluster. The cluster status field identifies whether the cluster is empty, on disk, in memory, or contains an uncacheable file. In the preferred embodiment, the cluster ID identifies the location of the cluster (either the address on disk or the address in memory).

The system provides the following routines, listed below with their C programming language prototypes, which return a positive integer or zero if the operation is successful, and a negative value if there is an error (which value corresponds to the error which occurred):

int write_file(char* fname, void* buf, size_t sz);
    Asynchronously writes the contents of the memory area starting at buf with size sz to disk with filename fname and returns the size of the file. The pointer *buf is now the responsibility of the file system.
  int read_file(char* fname, void** buf);
    Sets *buf to the beginning of the memory area containing the contents of the file fname. Increments the file's reference count and returns the size of the file. If the file is not in main memory, a cluster containing the specified file will be read from disk. The pointer *buf to the file in main memory remains valid until a corresponding call to done_read_file( ) is made.
  int done_read_file(char* fname, void* buf);
    Releases the space occupied by the file in main memory and decrements the reference count.
  int delete_file(char* fname);
    Deletes the file fname. The file must not have any active read_file( ).
  int collocate_files(char* fnameA, char* fnameB);
    Attempts to collocate file fnameB with file fnameA on disk. Both files must be previously written (by calling write_file( )). The collocation is not necessarily done—for example, the number of files to be collocated could be greater than the cluster size, or the collocate_files( ) call may arrive too late after write_file( ) calls.
  int write_nomem_file(char* fname, void* buf, size_t sz);
    Bypasses the main memory cache, and writes a file directly to disk. The file is flagged so that when it is read, and is immediately released when the application issues the done_read_file( ).

A number of daemons are used which make space available by performing the packing of files 110 into clusters 120, evicting of data from main memory 100, and freeing space on disk 150. These daemons are active when needed (if the resource they manage needs maintenance) or when the file system is idle in a round-robin fashion, and can be synchronously called by a function if needed. In an alternate embodiment, the daemon may also run after a certain period of time has elapsed without the daemon running. These include:

pack_files_daemon( )
    Uses the LRU list to create a cluster of files and writes the cluster to disk. The daemon packs the files using the information from collocate_file( ) calls, attempting to pack files from the same locality set in the same cluster. The daemon takes files from the tail of the LRU list which are the oldest files. Clusters do not have to be packed to that they are completely full, a tunable threshold (in the preferred embodiment 75%) is specified. In another preferred embodiment, a daemon packs the files from the head of the LRU list (which will be the most recently accessed files) to decrease the number of "hot" files not on disk; this daemon is called pack_files_from_head_daemon( ).
  free_main_memory_data_daemon( )
    Evicts data when the amount of main memory 100 used by the is at or over a tunable threshold. The daemon does this in order to attempt to reduce the number of synchronous evictions required when new memory is needed. This daemon determines what to evict using the LRU lists. If there are files that are older than the oldest cluster, the daemon packs files together in a cluster as the pack_files_daemon( ) does. If a cluster is evicted, since it is clean (already present on disk 150) it need not be written to disk 150.
  free_disk_space_daemon( )
    Frees disk space by deleting files on disk or clusters. In a preferred embodiment, this may be done based on a specified file lifetime, after which a file should automatically be deleted. Deleting could also occur on a cluster basis using the cluster lifetime—once all files in a cluster have exceeded the lifetime, the cluster is deleted. If the file or cluster lifetime is too large, then no files will be deleted when disk space is needed. If this occurs, a read_file( ) that attempts to evict files to disk 150 will return an error code.

In another embodiment, checksums for the Transmission Control Protocol (TCP) are precomputed. In one embodiment, the proxy cache is using the Transmission Control Protocol (TCP) to communicate with users. The TCP protocol requires that all data is sent in packets that include a checksum of the packet's contents. Since the proxy cache returns known data as a result of a cache hit, the preferred embodiment pre-computers the checksum of the file contents when the file is first stored in the file system. In this way, there is no need to compute the checksum when file contents are sent to users multiple times. Moreover, this embodiment reduces the latency of response to cache hits, since the checksum is pre-computed. In the preferred embodiment, locality sets are static, once a cluster is written to disk 150, they do not change. Also, once a locality set is written to a cluster, the collocate hints are deleted. In an alternate embodiment, locality sets are dynamic, and files can be added to existing clusters. Collocate calls or other locality data may be evaluated more than just once in order to pack or repack clusters.

In the preferred embodiment, only two files can be associated using the collocate_files( ) call which takes two filenames. In an alternate embodiment, several files can be associated using a collocate_files call which can accept more than two file names, and files can be strongly or loosely associated using any one of a number of algorithms to determine whether files are always, often, or never accessed in temporal proximity.

In the preferred embodiment, the disk 150 is scanned in the background after the system recovers in order to rebuild the meta-data which is resident in main memory 100. This may be difficult, because sufficient idle time may not be available after a crash and system performance may be degraded and the hit rate only slowly convergent to pre-crash rates. In an alternate embodiment, the meta-data is recorded on the disk. Also recorded on disk is a log of the delete_file( ) calls. The size of the log of these calls is user-specified, and therefore fixed; it must be cleaned when it gets close to the log size. (The size of logged calls which will trigger cleaning of this log is user-tuneable.) Also recorded on disk is a user-tunable number of "hot clusters" which are the clusters that are frequently accessed. The hot clusters will be recovered first in the event of a crash to warm the main memory cache. A hot cluster threshold will be used to determine when some cleaning is needed of the hot clusters in order to make room for new hot clusters. The file system meta-data, delete_file( ) call log, and hot clusters are written to disk by daemons.

Several parameters are available for use in order to modify the system to its workload. The parameters which are set at file system initialization include: size of a cluster, cluster threshold (the maximal disk internal fragmentation), memory cache threshold to begin cleaning, memory cache eviction policy, file hash table size, file and cluster lifetimes, disk data layout policy, the delete_file( ) call log threshold, the size of the delete_file( ) call log, the number of hot clusters, the hot cluster threshold, and size and name of the disks. During run time, the proxy is free to reset the lifetime of clusters or files. These lifetimes are used by the background daemons to decide whether to remove a file or cluster from the cache.

While the invention has been described by illustrative embodiments, additional advantages and modifications will occur to those skilled in the art. Therefore the invention in its broader aspects is not limited to specific details shown and described herein. Modifications may be made without departing from the spirit and scope of the invention. Accordingly, it is intended that the invention not be limited to the specific illustrative embodiments but be interpreted within the full spirit and scope of the appended claims and their equivalents.

We claim:

1. A file system for a client computer system which comprises main memory and at least one secondary storage device, where said file system is programmed to receive and service file requests, to control accesses (including reads and writes) to a main memory, to group files together in clusters, and to store and retrieve clusters from said at least one secondary storage device, and where said file system comprises file system clustering logic which assists in said grouping of files together in clusters by grouping together files likely to be requested from said file system in close temporal proximity.

2. The file system of claim 1, further comprising: a library of functions provided to applications by said file system, a function which takes as arguments at least two file names, which, when called, indicates to said file system clustering logic that said at least two file names provided as arguments should be stored together in one cluster if possible.

3. The file system of claim 1, where said file system clustering logic examines historical calls to files in order to determine which files are likely to be requested from said file system in tandem or close temporal proximity.

4. The file system of claim 3, further, comprising, as part of a library of functions provided to applications by said file system, a collocation function which takes as arguments at least two file names, which, when called, indicates to said file system clustering logic that the files named by the file names provided as arguments should be stored together in one cluster if possible.

5. A caching proxy system comprising a computer system utilizing the file system of claim 4, and programmed to receive and serve requests for data from a large distributed-data network.

6. The caching proxy system of claim 5, where said computer system is programmed to utilize said collocation function to provide an indication to said file system that the files named by the file names provided as arguments should be stored together in one cluster if possible.

7. The caching proxy system of claim 5, where said large distributed-data network is the World Wide Web.

8. The file system of claim 1, where said file system is further programmed to maintain and update meta-data, including file system meta-data stored in said main memory regarding said file system's usage of said main memory; file meta-data information regarding files stored in said main memory which have not yet been grouped into a cluster; and cluster meta-data regarding clusters stored in one of said at least one secondary storage device.

9. The file system of claim 8, where said file meta-data comprises a hash table and file information including a file number, file location in main memory or in a cluster, the status of the file, and a reference count of the number of users currently reading the file.

10. The file system of claim 9, where said maintenance and updating of file meta-data comprises the steps of computing a hash for the file name of each file being accessed and updating the file meta-data for the file at the corresponding entry in said has table, or, if the corresponding entry does not match said file name, updating the file meta-data for the next consecutive entry in said hash table.

11. The file system of claim 1, where said file system is further programmed to maintain and update meta-data, including file system meta-data stored in said main memory regarding said file system's usage of said main memory; file meta-data information regarding files stored in said main memory which have not yet been grouped into a cluster; and cluster meta-data regarding clusters stored in one of said at least one secondary storage device and where said file system is further programmed to, upon the loss of the meta-data, scan said at least one secondary storage device after recovery and rebuild said meta-data.

12. The file system of claim 1, where said file system is further programmed to maintain and update meta-data, including file system meta-data stored in said main memory regarding said file system's usage of said main memory; file meta-data information regarding files stored in said main memory which have not yet been grouped into a cluster; and cluster meta-data regarding clusters stored in one of said at least one secondary storage device and where said file system is further programmed to record set meta-data in said at least one secondary storage device, and, upon loss of the meta-data, to recover said meta-data from said at least one secondary storage device.

13. The file system of claim 8 where said file system is further programmed to access said file meta-data to determine the location of a file being requested.

14. The file system of claim 8, where said cluster meta-data information comprises for each cluster stored on said at least one secondary storage device, information about the status (empty, on disk, in memory, uncacheable) of the cluster, information about the last time the cluster was accessed, and a linked list of files in the cluster.

15. The file system of claim 14, where the size of said clusters does not vary.

16. The file system of claim 14, where said file system is further programmed to maintain and update meta-data, including file system meta-data stored in said main memory regarding said file system's usage of said main memory; file meta-data information regarding files stored in said main memory which have not yet been grouped into a cluster; and cluster meta-data regarding clusters stored in one of said at least one secondary storage device and where the size of said clusters varies.

17. The file system of claim 16, where the size of said clusters is selected from a finite subset of possible cluster sizes.

18. The file system of claim 14, where said file system is further programmed to maintain and update meta-data, including file system meta-data stored in said main memory regarding said file system's usage of said main memory; file meta-data information regarding files stored in said main memory which have not yet been grouped into a cluster; and cluster meta-data regarding clusters stored in one of said at least one secondary storage device and where the size of said clusters is selected using information about the size of files stored together in clusters.

19. The file system of claim 14, where said file system is further programmed to maintain and update meta-data, including file system meta-data stored in said main memory regarding said file system's usage of said main memory; file meta-data information regarding files stored in said main memory which have not yet been grouped into a cluster; and cluster meta-data regarding clusters stored in one of said at least one secondary storage device and where the size of said clusters are based on powers of two.

20. The file system of claim 1, further comprising a library of functions provided to applications by said file system, comprising a write function which, when called, writes a given file directly to said at least one secondary storage device.

21. The file system of claim 20, where said write function, when called, removes the given file from memory.

22. The file system of claim 20, where said writing of a given file directly to said at least one secondary storage device is delayed until more space is needed in said main memory.

23. The file system of claim 1, further comprising a library of functions provided to applications by said file system, comprising a read function which, when called with the name of a requested file, reads a cluster containing said requested file to said main memory if said requested file was not available in said main memory, and, upon completion of said reading of said cluster containing the requested file to said main memory or if said requested file was available in said main memory, returns a pointer to said requested file in main memory and protects said requested file in said main memory.

24. The file system of claim 23, said library of functions further comprising:
a done read function which, when called with a pointer returned bys aid read function call, indicates that said protection of said requested file in main memory prompted by said read function call should end.

25. The file system of claim 1, where said file system further comprises a daemon which groups files together in clusters and stores clusters to said at least one secondary storage device.

26. The file system of claim 25, where the operations of said daemon occur when more space is needed in said main memory.

27. The file system of claim 25, where the operations of said daemon occur when said file system is idle.

28. The file system of claim 25, where the operations of said daemon occur when more space is needed in said main memory or when said file system is idle.

29. The file system of claim 1, where said file system accesses file system parameter data, comprising data on file and cluster lifetimes.

30. The file system of claim 29, where said file system further comprises a disk space daemon which uses said file system parameter data in order to clean said at least one secondary storage device.

31. The file system of claim 29, where said file system further comprises a pack files daemon which performs said grouping of files together in clusters.

32. The file system of claim 31, where said pack files daemon packs the least recently used files into clusters.

33. The file system of claim 31, where said pack files daemon packs the most recently used files into clusters.

34. The file system of claim 31, where said file system further comprises at least two of said pack files daemons which perform said grouping of files together in clusters, at least one of which packs the least recently used files into clusters, and at least one other of which packs the most recently used files into clusters.

35. The file system of claim 29, where said file system, during operation, can change and reset said data on file and cluster lifetimes.

36. The file system of claim 35, where said changing and resetting of said data on file and cluster lifetimes uses access information about accesses of said file system.

37. The file system of claim 1, where said file system accesses file system parameter data, comprising at least one of: file lifetime, cluster size, cluster threshold, memory cache threshold to begin cleaning, memory cache eviction policy, file hash table size, disk data layout policy, delete file log threshold, size of delete log, number of hot clusters, hot cluster threshold and the size and name of the said at least one secondary storage device.

38. The file system of claim 1, where said file system is further programmed to identify clusters stored in said main memory as hot clusters, and to store said hot clusters on a prespecified area of one of said at least one secondary storage device.

39. The file system of claim 38, where said file system is further programmed to recover from a crash or other abnormal functioning by reading said hot clusters from said prespecified area of one of said at least one secondary storage device and writing said hot clusters to said main memory.

40. The file system of claim 1, where said file system is further programmed to identify clusters stored in said main memory as hot clusters, and to store the locations information regarding said hot clusters on a prespecified area of one said at least one secondary storage device.

41. The file system of claim 38, where said file system includes a hot cluster daemon which performs said identification and storage of hot clusters.

42. The file system of claim 41, where said hot cluster daemon runs during system idle time.

43. The file system of claim 41, where said hot cluster daemon runs when a hot cluster threshold is reached.

44. The file system of claim 41, where said hot cluster daemon runs when called.

45. The file system of claim 41, where said hot cluster daemon runs during system idle time, when a hot cluster threshold is reached, or when called.

46. The file system of claim 29, where said file system is further programmed to log deletions of files and clusters in delete log which is stored on one of said at least one secondary storage devices.

47. The file system of claim 46, where said logging of deletions occurs during system idle time.

48. The file system of claim 46, where said logging of deletions occurs when a threshold on delete log size is reached.

49. The file system of claim of 46, where said logging of deletions occurs when requested.

50. The file system of claim 48, where said logging of deletions occurs when logging has not occurred for a specified period of time.

51. The file system of claim 46, where said logging of deletions occurs during system idle time, when a threshold on delete log size is reached, when requested, or when logging has not occurred for a specified period of time.

52. The file system of claim 46, were said to delete log is used to recover from a crash or other abnormal functioning.

53. The file system of claim 46, where said file system accesses file system parameter data, including delete file log threshold data and delete log size data, where possible size of said delete log is given by delete log size data, and where said file system is further programmed to monitor said delete log, and to clean said delete log when said delete log reaches the size given by said delete file log threshold data.

54. The file system of claim 29, where said system is further programmed to precompute checksums for a transmission protocol for stored files and to send the precomputed checksum when the files are accessed.

55. The file system of claim that 54, where the transmission protocol is the Transmission Control Protocol (TCP).

* * * * *